US011359601B2

(12) United States Patent
Xue (10) Patent No.: US 11,359,601 B2
(45) Date of Patent: Jun. 14, 2022

(54) METHOD, DEVICE AND SYSTEM FOR DETERMINING ANGLE-TO-WIND DEVIATION AND CORRECTING ANGLE-TO-WIND (71) Applicant: BEIJING GOLDWIND SCIENCE & CREATION WINDPOWER EQUIPMENT CO., LTD., Beijing (CN)

(72) Inventor: Jianguo Xue, Beijing (CN)

(73) Assignee: BEIJING GOLD WIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 147 days.

(21) Appl. No.: 16/768,040

(22) PCT Filed: Jul. 11, 2018

(86) PCT No.: PCT/CN2018/095244
§ 371 (c)(1),
(2) Date: May 28, 2020

(87) PCT Pub. No.: WO2019/165743
PCT Pub. Date: Sep. 6, 2019

(65) Prior Publication Data
US 2020/0362816 A1 Nov. 19, 2020

(30) Foreign Application Priority Data

Feb. 28, 2018 (CN) .......................... 201810167196.1

(51) Int. Cl.
F03D 7/02 (2006.01)
F03D 17/00 (2016.01)

(52) U.S. Cl.
CPC ........... F03D 7/0204 (2013.01); F03D 17/00 (2016.05); F05B 2260/74 (2013.01); F05B 2260/83 (2013.01); F05B 2270/1033 (2013.01); F05B 2270/1095 (2013.01); F05B 2270/32 (2013.01); F05B 2270/321 (2013.01)

(58) Field of Classification Search
CPC ...... F03D 17/00; F03D 7/0204; F03D 7/0224; F05B 2270/1033; F05B 2270/1095;
(Continued)

(56) References Cited

U.S. PATENT DOCUMENTS

2015/0086357 A1 3/2015 Gregg
2016/0222944 A1 8/2016 Stoltenjohannes et al.
(Continued)

FOREIGN PATENT DOCUMENTS

CN 104314757 A 1/2015
CN 104481804 A 4/2015
(Continued)

OTHER PUBLICATIONS

Extended European Search Report issued in European Application No. EP 18 90 8257, dated Dec. 17, 2020, 7 pages.
(Continued)

Primary Examiner — Juan G Flores
Assistant Examiner — Joshua R Beebe
(74) Attorney, Agent, or Firm — Bayes PLLC (57) ABSTRACT A method, device and system for determining angle-to-wind deviation and correcting angle-to-wind; the method for determining angle-to-wind deviation comprises: obtaining historical operation data of a wind turbine group during a specific time period (S101); determining an angle-to-wind deviation value for each wind speed segment on the basis of the acquired historical operation data (S102); for any wind speed segment, determining the angle-to-wind deviation value on the basis of the actual angle-to-wind measurement value and the output power value of an environmental wind speed value at a time point within the specific time period.

14 Claims, 4 Drawing Sheets (58) Field of Classification Search
CPC ............ F05B 2270/32; F05B 2270/321; F05B 2270/802; F05B 2260/74; F05B 2260/83; F05B 2200/30; Y02E 10/723
See application file for complete search history.

(56) References Cited

U.S. PATENT DOCUMENTS

| | | | |
|---|---|---|---|
| 2017/0198680 A1 | 7/2017 | Wu et al. | |
| 2017/0268484 A1 | 9/2017 | Li et al. | |
| 2018/0003153 A1* | 1/2018 | Damgaard | F03D 7/042 |
| 2018/0355846 A1* | 12/2018 | Nielsen | F03D 7/0204 |
| 2018/0363625 A1* | 12/2018 | Nielsen | F03D 7/0204 |

FOREIGN PATENT DOCUMENTS

| | | |
|---|---|---|
| CN | 105548614 A | 5/2016 |
| CN | 105569922 A | 5/2016 |
| CN | 105909466 A | 8/2016 |
| KR | 101788423 B1 | 10/2017 |
| WO | 2017/108062 A1 | 6/2017 |

OTHER PUBLICATIONS

First Examination Report in corresponding Indian Application No. 202017018224, dated Dec. 21, 2020, (5 pages).
International Search Report and Written Opinion in corresponding PCT Application No. PCT/CN2018/095244, dated Nov. 16, 2018, 9 pages.

* cited by examiner

METHOD, DEVICE AND SYSTEM FOR DETERMINING ANGLE-TO-WIND DEVIATION AND CORRECTING ANGLE-TO-WIND

CROSS-REFERENCE TO RELATED APPLICATIONS

This application is a national phase of International Application No. PCT/CN2018/095244, filed on Jul. 11, 2018, which claims the benefits of priority to Chinese Patent Application No. 201810167196.1, filed on Feb. 28, 2018. Each of the above-identified application is incorporated herein by reference in its entirety.

TECHNICAL FIELD

The present disclosure generally relates to the technical field of wind power generation, and in particular, to a method and an apparatus for determining a deviation in a wind alignment angle of a wind turbine, and a method and a system for correcting a wind alignment angle of a wind turbine.

BACKGROUND

Figure 1:
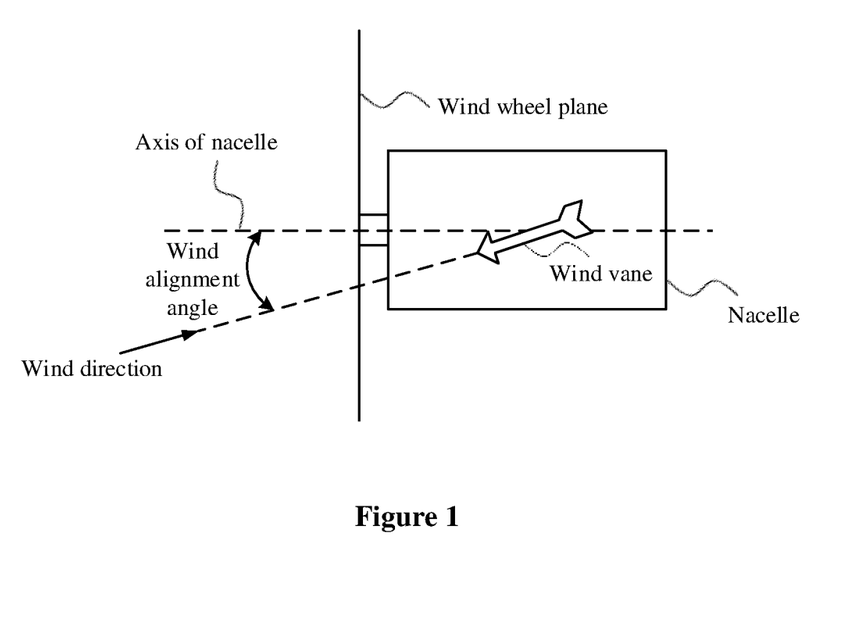
FIG. 1 is a schematic diagram of detecting a wind alignment by a wind vane in conventional technology.

In conventional wind power generation industry, a horizontal axis design is usually adopted in a mainstream of wind turbines with power higher than a level of megawatts. It is necessary to provide the wind turbine with a yaw system in the horizontal axis design. A main function of the yaw system is keeping the wind turbine windward during power generation, and thereby it is necessary that the yaw system keeps tracking a wind direction. As shown in FIG. 1, the yaw system generally detects a wind alignment angle (an angle between the wind direction and an axis of a nacelle) via a wind direction sensor (for example, a wind vane) installed at a top of the nacelle.

An error between a wind alignment angle detected by the yaw system of the wind turbine and a real wind alignment angle is caused by an initial installation error, a failure due to long-term operation, and an influence of a wake of an impeller. Thus, the wind turbine cannot be kept windward based on a yaw angle that is determined from the wind alignment angle detected by the yaw system. Not only power generation of the wind turbine is reduced, but also a load imbalance of the wind turbine is exaggerated. Therefore, it is particularly important how to determine a deviation in the detected wind alignment angle easily and effectively.

SUMMARY

A method and an apparatus for determining a deviation in a wind alignment angle of a wind turbine, and a method and a system for correcting a wind alignment angle of a wind turbine are provided according to embodiments of the present disclosure, which are capable to determine a deviation in a detected wind alignment angle of a wind turbine easily and effectively, and correct a subsequently detected wind alignment angle based on the determined deviation.

A method for determining a deviation in a wind alignment angle of a wind turbine is provided according to an embodiment of the present disclosure, including: obtaining history operation data of a wind turbine within a time period, where the history operation data includes ambient wind speeds, detected wind alignment angles, and output power that are at different moments in the time period; and determining the deviation in the wind alignment angle for a windspeed section, based on the detected wind alignment angle and the output power at a moment within in the time period, where the ambient wind speed at said moment belongs to the windspeed section.

A method for correcting a wind alignment angle of a wind turbine is provided according to another embodiment of the present disclosure, including: obtaining a current ambient wind speed and a current detected wind alignment angle of a wind turbine; determining a windspeed section to which the current ambient wind speed belongs; and correcting the current detected wind alignment angle based on a deviation in the wind alignment angle for the determined windspeed section, to determine a yaw angle of the wind turbine based on the detected wind alignment angle that is corrected; where the deviation in the wind alignment angle for the determined windspeed section is obtained based on the aforementioned method for determining the deviation in the wind alignment angle of the wind turbine, and the determined windspeed section serves as the windspeed section in the aforementioned method.

An apparatus for correcting a wind alignment angle of a wind turbine is provided according to another embodiment of the present disclosure, including: a history data obtaining unit, configured to obtain history operation data of a wind turbine within a time period, where the history operation data includes ambient wind speeds, detected wind alignment angles, and output power that are at different moments in the time period; and a deviation determination unit, configured to determine the deviation in the wind alignment angle for a windspeed section, based on the detected wind alignment angle and the output power at a moment within in the time period, where the ambient wind speed at said moment belongs to the windspeed section.

A system for correcting a wind alignment angle of a wind turbine is provided according to another embodiment of the present disclosure, including: a data obtaining module, configured to obtaining a current ambient wind speed and a current detected wind alignment angle of a wind turbine; a windspeed section determination module, configured to determine a windspeed section to which the current ambient wind speed belongs; and the aforementioned apparatus for determining the deviation in the wind alignment angle; and a correction module, configured to correct the current detected wind alignment angle based on the deviation in the wind alignment angle for the determined windspeed section, to determine a yaw angle of the wind turbine based on the detected wind alignment angle that is corrected; where the deviation in the wind alignment angle is outputted from the apparatus, and the determined windspeed section serves as the windspeed section for the apparatus.

A computer-readable storage medium storing a computer program is provided according to another embodiment of the present disclosure. The aforementioned method for determining the deviation in the wind alignment angle of the wind turbine is performed when the computer program is executed by a processor.

A computing device is provided according to another exemplary embodiment of the present disclosure. The computing device includes a processor and a memory storing a computer program. The aforementioned method for determining the deviation in the wind alignment angle of the wind turbine is performed when the computer program is executed by the processor.

A computer-readable storage medium storing a computer program is provided according to another embodiment of the present disclosure. The aforementioned method for correcting the wind alignment angle of the wind turbine is performed when the computer program is executed by a processor.

A control system of a wind turbine is provided according to another embodiment of the present disclosure. The control system includes a processor and a memory storing a computer program. The aforementioned method for correcting the wind alignment angle of the wind turbine is performed when the computer program is executed by the processor.

The method and the apparatus for determining the deviation in the wind alignment angle of the wind turbine, and the method and the system for correcting the wind alignment angle of the wind turbine are provided according to embodiments of the present disclosure. The deviation in the wind alignment angle can be determined for each windspeed section. The determined deviation can be used to correct a subsequently detected wind alignment angle, in a case that a corresponding ambient wind speed belongs to said windspeed section. Thereby, an effect of correcting the detected wind alignment angle is improved. The wind turbine can track a wind direction well through yaw control based on a yaw angle determined from the detected wind alignment angle that is corrected.

Hereinafter a part of additional aspects and/or advantages of the present disclosure is illustrated in the description. The other aspects and/or advantages of the present disclosure are apparent from the description, or may be obtained by practice based on the present disclosure.

BRIEF DESCRIPTION OF THE DRAWINGS

Hereinafter the drawings are described in conjunction with embodiments, and the aforementioned and other objectives and characteristics in the embodiments of the present disclosure would be clearer.

DETAILED DESCRIPTION

References are made to embodiments of the present disclosure for details. A same reference numeral always refers to a same component when illustrating examples of the embodiments in the drawings. Hereinafter embodiments are illustrated with reference to the drawings to explain the present disclosure.

Figure 2:
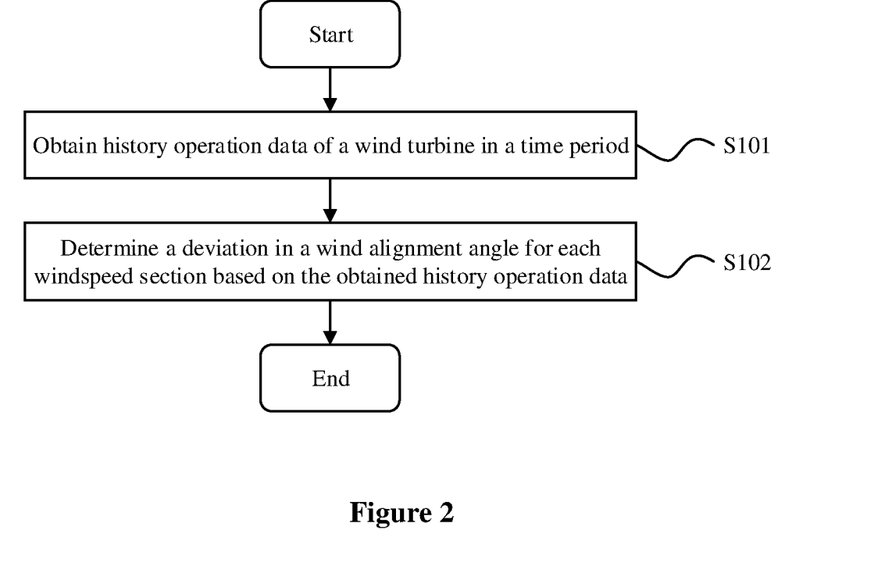
FIG. 2 is a flow chart of a method for determining a deviation in a wind alignment angle of a wind turbine according to an embodiment of the present disclosure.

FIG. 2 is a flow chart of a method for determining a deviation in a wind alignment angle of a wind turbine according to an embodiment of the present disclosure.

Reference is made to FIG. 2. In step S101, history operation data of a wind turbine within a time period is obtained.

The history operation data includes ambient wind speeds, detected wind alignment angles, and output power that are at different moments (that is, sampling points) in the time period. In one embodiment, adjacent sampling points may be spaced by a predetermined duration (that is, a sampling period may serve as the predetermined duration). For example, the predetermined duration may be 10 minutes.

The ambient wind speed is a wind speed of an environment in which the wind turbine is located. The detected wind alignment angle is a wind alignment angle that is detected by a hardware apparatus (for example, a wind direction sensor). The output power is power generated by the wind turbine.

In one embodiment, the time period may be a time period in which the wind turbine operates normally, which excludes a failure of the wind turbine, starting and halting of the wind turbine, and limited-power operation of the wind turbine.

In one embodiment, the history operation data of the wind turbine within the time period may be obtained from a supervisory control and data acquisition system (SCADA), or obtained from a main control system of the wind turbine.

In step S102, the deviation in the wind alignment angle is determined for each windspeed section based on the obtained history operation data. The deviation in the wind alignment angle is determined for a windspeed section, based on the detected wind alignment angle and the output power at a moment within the time period, where the ambient wind speed at said moment belongs to the windspeed section.

In one embodiment, the deviation in the wind alignment angle for each windspeed section may be used to correct a wind alignment angle that is subsequently detected, in a case that a subsequently acquired ambient wind speed belongs to the windspeed section.

In one embodiment, determining the deviation in the wind alignment angle for the windspeed section may include a following step. The deviation in the wind alignment angle is determined for an i-th windspeed section based on average power of each angle section corresponding to the i-th windspeed section, where the i-th windspeed section serves as the windspeed section. Average power $P_{ij}$ of a j-th angle section corresponding to the i-th windspeed section is an average of output power at all the moments, at each of which the ambient wind speed belongs to the i-th windspeed section and the detected wind alignment belongs to the j-th angle section.

A predetermined windspeed range is divided into M windspeed sections, with a first predetermined interval. A predetermined angle range is divided into N angle sections, with a second predetermined interval, where i and j are integers, $M \geq i > 0$, and $N \geq j > 0$. In one embodiment, the predetermined wind speed range may be determined based on wind speeds for starting and halting the wind turbine. For example, the predetermined wind speed range is from a wind speed for starting the wind turbine to a wind speed for halting the wind turbine.

Figure 3:
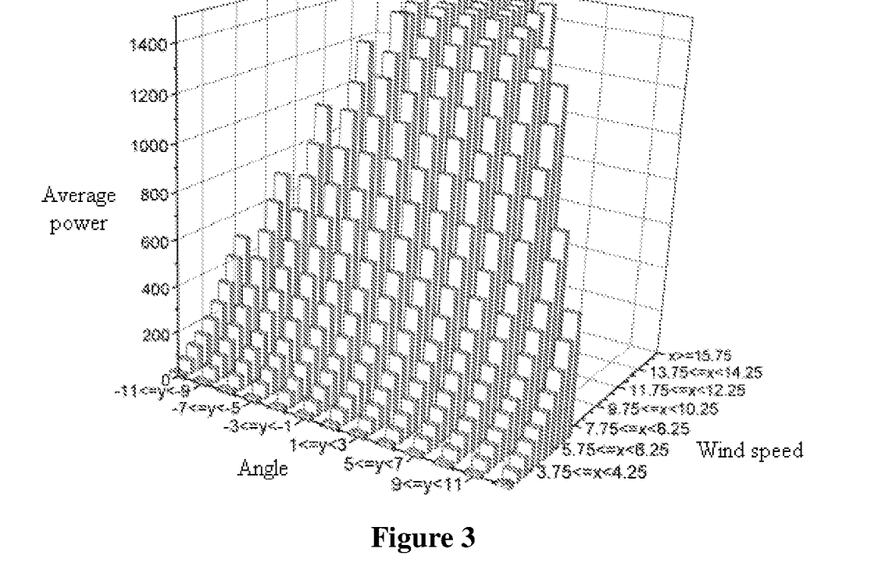
FIG. 3 is a statistical graph of average power of each angle section corresponding to each windspeed section according to an embodiment of the present disclosure.

FIG. 3 is a statistical graph of average power of each angle section corresponding to each windspeed section according to an embodiment of the present disclosure. In FIG. 3, an x-axis indicates a wind speed. Specifically, the predetermined wind speed range is from 2.75 m/s to 15.75 m/s, the first predetermined interval is 0.5 m/s, and thereby the predetermined wind speed range is divided into 28 windspeed sections. A y-axis indicates an angle. Specifically, the predetermined angle range is from −11° to 11°, the second predetermined interval is 2°, and thereby the predetermined angle range is divided into 13 angle sections. A z-axis indicates average power. In a specific embodiment, each windspeed section corresponds to N angle sections (N is equal to 13 in FIG. 3). A value of z-axis coordinate of each angle section corresponding to each windspeed section is an average of output power at all the moments, at each of which the ambient wind speed belongs to said windspeed section and the detected wind alignment angle belongs to said angle section.

In a preferable embodiment, two arrays A and B of a size M*N may be predefined. An element located in an i-th row and a j-th column in the array A stores cumulation of output power at all the moments, within the time period, at each of which the ambient wind speed belongs to the i-th windspeed section and the detected wind alignment angles belongs to the j-th angle section. An element located in an i-th row and a j-th column in the array B stores a quantity of all the moments, within the time period, at each of which the ambient wind speed belongs to the i-th windspeed section and the detected wind alignment angles belongs to the j-th angle section. Thus, $P_{ij}$ may be calculated based on the array A and the array B. In this embodiment, a factor relevant to a sequence of the obtained history operation data is ignored, and thereby an amount of stored data can be effectively reduced. It is facilitated that the method for determining the deviation in the wind alignment angle of the wind turbine is implemented online.

In one embodiment, determining the deviation in the wind alignment angle for the windspeed section may include a following step. The deviation in the wind alignment angle for an i-th windspeed section is determined based on average power of all angle sections corresponding to the i-th windspeed section and power of the wind turbine facing windward for the i-th windspeed section. The power of the wind turbine facing windward for the i-th windspeed section is obtained based on the history operation data at all the moments, within the time period, at each of which the ambient wind speed belongs to the i-th windspeed section.

In one embodiment, determining the deviation in the wind alignment angle for the i-th windspeed section may include a following step. Average power of the N angle sections corresponding to the i-th windspeed section, and medians of the N angle sections, are fitted based on equation (1), so as to obtain the deviation $\alpha_i$ in the wind alignment angle for the i-th windspeed section and the power $P_{i\ max}$ of the wind turbine facing windward for the i-th windspeed section.

$$P_{ij} = P_{imax} \cos^3(\theta_{ij} - \alpha_i) \qquad (1)$$

In equation (1), $\theta_{ij}$ indicates the median of the j-th angle section corresponding to the i-th windspeed section, that is, the median of the j-th angle section. $P_{i\ max}$ indicates the power of the wind turbine facing windward for the i-th windspeed section, which is reflected by the history operation data at all the moments at each of which the ambient wind speed belongs to the i-th windspeed section.

Specifically, a series of data pairs of $P_{ij}$ and $\theta_{ij}$ (that is, $(P_{i1}, \theta_{i1}), (P_{i2}, \theta_{i2}), (P_{i3}, \theta_{i3}), \ldots, (P_{iN}, \theta_{iN})$) are subject to curve-fitting (for example, fitted through a least square algorithm) based on equation (1), so as to obtain unknowns $\alpha_i$ and $P_{i\ max}$. It should be understood that a corresponding data pair $(P_{ia}, \theta_{ia})$ is not used for the fitting, in a case that there is no moment at which the ambient wind speed belongs to the i-th windspeed section and the detected wind alignment angle belongs to an a-th angle section (that is, there is no $P_{ia}$). In one embodiment, a corresponding data pair $(P_{ia}, \theta_{ia})$ may not be used for fitting, in a case that a quantity of all the moments, at each of which the ambient wind speed belongs to the i-th windspeed section and the detected wind alignment angle belongs to an a-th angle section, is less than a predetermined number.

In one embodiment, $\theta_{ij}$ in equation (1) may indicate alternatively an average of the detected wind alignment angles at all the moments, within the time period, at each of which the ambient wind speed belongs to the i-th windspeed section and the detected wind alignment angle belongs to the j-th angle section.

In another embodiment, determining the deviation in the wind alignment angle for the i-th windspeed section may include following steps. The deviation in the wind alignment angle is obtained for each pair of symmetrical angle sections corresponding to the i-th windspeed section. The deviation in the wind alignment angle for the i-th windspeed section is determined based on the obtained deviation in the wind alignment angle for each pair of symmetrical angle sections.

In one embodiment, the step of obtaining deviation in the wind alignment angle for each pair of symmetrical angle sections corresponding to the i-th windspeed section may be implemented as follows. The deviation in the wind alignment angle for a pair of symmetrical angle sections corresponding to the i-th windspeed section may be determined based on average power of both angle sections that are included in the pair of symmetrical angles corresponding to the i-th windspeed section. Each pair of symmetrical angle sections includes two angle sections that are symmetrical with respect to a reference angle section, and the reference angle section is one of the N angle sections. For example, in a case that the reference angle section is [−1°, 1°), angle sections [−3°, −1°) and [1°, 3°) are a pair of symmetrical angle sections, and angle sections [−5°, −3°) and [3°, 5°) are a pair of symmetrical angle sections.

In one embodiment, the obtained deviations in the wind alignment angle for all the pairs of symmetrical angle sections corresponding to the i-th windspeed section may be averaged, to obtain the deviation in the wind alignment angle for the i-th windspeed section.

In one embodiment, the step of obtaining the deviation in the wind alignment angle for the pair of symmetrical angle sections corresponding to the i-th windspeed section may include a following step. For a k-th pair of symmetrical angle sections serving as the pair of symmetrical angle sections, average power $P_{i(k_1)}$ and $P_{i(k_2)}$ of angle sections $k_1$ and $k_2$, respectively, corresponding to the i-th windspeed section are obtained. The deviation $\alpha_{i(k)}$ in the wind alignment angle is calculated for the k-th pair of symmetrical angle sections corresponding to the i-th windspeed section based on equation (2) or equation (3):

$$\alpha_{i(k)} = \cos^{-1} \frac{P_{i(ref)}^{\frac{1}{3}}}{\left( \frac{P_{i(ref)}^{\frac{2}{3}} - P_{i(k_1)}^{\frac{1}{3}} P_{i(k_2)}^{\frac{1}{3}}}{1 - \left( \frac{P_{i(k_1)}^{\frac{1}{3}} + P_{i(k_2)}^{\frac{1}{3}}}{2 P_{i(ref)}^{\frac{1}{3}}} \right)^2} \right)^{\frac{1}{2}}} \qquad (2)$$

$$\alpha_{i(k)} = \tan^{-1} \frac{\left( P_{i(k_1)}^{\frac{1}{3}} + P_{i(k_2)}^{\frac{1}{3}} \right) \cos \frac{d_k}{2}}{\left( P_{i(k_2)}^{\frac{1}{3}} - P_{i(k_1)}^{\frac{1}{3}} \right) \sin \frac{d_k}{2}} \qquad (3)$$

k is an integer greater than 0, $k_1$ and $k_2$ indicate angle sections included in the k-th pair of symmetrical angle sections. $P_{i(ref)}$ indicates average power of the reference angle section corresponding to the i-th windspeed section. $d_k$ is equal to a difference in a sequential number between the two angle sections $k_1$ and $k_2$ multiplying the second predetermined interval. For example, the difference in the sequential number between angle sections [−3°, −1°] and [1°, 3°] in a pair of symmetrical angle sections is 2, and the difference in the sequential number between angle sections [−5°, −3°] and [3°, 5° ] in a pair of symmetrical angle sections is 4.

$P_{i(k_1)}$ indicates an average of output power at all the moments at each of which the ambient wind speed belongs to the i-th windspeed section and the detected wind alignment angle belongs to the angle section $k_1$. $P_{i(k_2)}$ indicates an average of output power at all the moments at each of which the ambient wind speed belongs to the i-th windspeed section and the detected wind alignment angle belongs to the angle section $k_2$. $P_{i(ref)}$ indicates an average of output power at all the moments at each of which the ambient wind speed belongs to the i-th windspeed section and the detected wind alignment angle belongs to the reference angle section.

In one embodiment, $\alpha_{i(k)}$ may be calculated only in a case that a difference between $d_k$ and an angle difference is less than a first preset threshold, where the angle difference is between the two angle sections $k_1$ and $k_2$ and calculated based on $P_{i(k_1)}$, $P_{i(k_2)}$, and $P_{i(ref)}$. In other words, $\alpha_{i(k)}$ is not calculated for the k-th pair of symmetrical angle sections, in a case that the difference between $d_k$ and the angle difference is greater than or equal to the first preset threshold. Namely, there is no $\alpha_{i(k)}$ in determining the deviation $\alpha_i$ in the wind alignment angle for the i-th windspeed section. That is, it may be checked in this step whether the history operation data of the k-th pair of symmetrical angle sections corresponding to the i-th windspeed section satisfies equation (1). In a case that the history operation data of the k-th pair of symmetrical angle sections corresponding to the i-th windspeed section satisfies equation (1), the deviation $\alpha_i$ in the wind alignment angle may be calculated based on the history operation data of the k-th pair of symmetrical angle sections corresponding to the i-th windspeed section.

In one embodiment, the angle difference $\gamma_{i(k)}$ between the two angle sections $k_1$ and $k_2$, which are included in the k-th pair of symmetrical angle sections corresponding to the i-th windspeed section, may be calculated based on equation (4).

$$\gamma_{i(k)} = \cos^{-1} \frac{P_{i(k_1)}^{\frac{1}{3}} + P_{i(k_2)}^{\frac{1}{3}}}{2 P_{i(ref)}^{\frac{1}{3}}} \quad (4)$$

The deviation in the wind alignment angle can be easily and effectively calculated for each windspeed section according to the above embodiments. In addition, it should be understood that the deviation in the wind alignment angle may be determined for each windspeed section in other suitable manners, based on the detected wind alignment angle and the output power at the moment at which the ambient wind speed belongs to the windspeed section. Such manners are not limited in embodiments of the present disclosure. For example, a maximum may be taken in one manner. Specifically, one or more largest output power are acquired among output power at all the moments at each of which the ambient wind speed belongs to the i-th windspeed section, and a detected wind alignment angle corresponding to the one or more largest output power is obtained. Medians of all angle sections to which the detected wind alignment angle belongs are averaged, to obtain the deviation in the wind alignment angle for the i-th windspeed section.

In one embodiment, the method for determining the deviation in the wind alignment angle of the wind turbine may further includes a following step. Abnormal data in the obtained history operation data is determined for each windspeed section, and the determined abnormal data is deleted. The step S102 is performed based on the history operation data from which the abnormal data is deleted.

In one embodiment, the step of determining abnormal data in the obtained history operation data for each windspeed section may be implemented as follows. The ambient wind speeds, the detected wind alignment angles, and the output power at all the moments, at each of which the ambient wind speed belongs to the i-th windspeed section and the detected wind alignment angles belongs to the j-th angle section, are determined as the abnormal data for the i-th windspeed section, in a case that a quantity of all said moments is less than a second preset threshold, and/or in a case that a standard deviation of output power at all said moments is greater than a third preset threshold.

Figure 4:
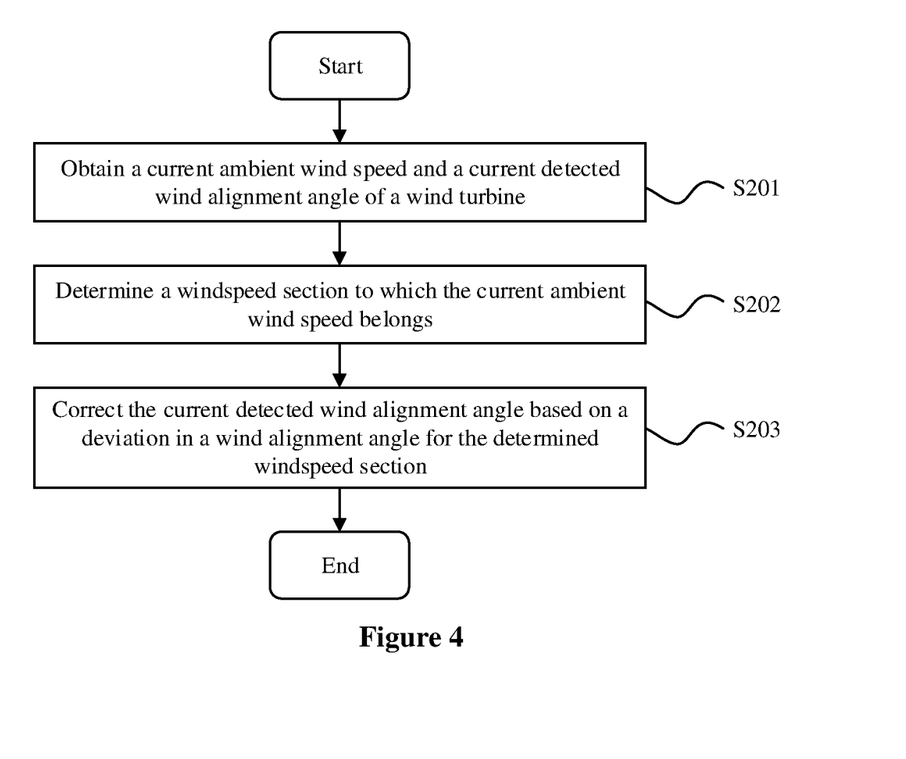
FIG. 4 is a flow chart of a method for correcting a wind alignment angle of a wind turbine according to an embodiment of the present disclosure.

FIG. 4 is a flow chart of a method for correcting a wind alignment angle of a wind turbine according to an embodiment of the present disclosure.

Reference is made to FIG. 4. In step S201, a current ambient wind speed and a current detected wind alignment angle of the wind turbine are obtained.

In step S202, a windspeed section to which the current ambient wind speed belongs is determined.

In step S203, the current detected wind alignment angle is corrected based on a deviation in the wind alignment angle for the determined windspeed section, so as to determine a yaw angle of the wind turbine based on the detected wind alignment angle that is corrected. Thereby, yaw control is performed based on the determined yaw angle.

The deviation in the wind alignment angle for the determined windspeed section is obtained by a method for determining the deviation in the wind alignment angle of the wind turbine according to an embodiment as shown in FIG. 2. In one embodiment, the method for correcting the wind alignment angle of the wind turbine may further include the steps S101 and S102 as shown in FIG. 2.

In one embodiment, the step of correcting the current detected wind alignment angle may include a followings step. The deviation in the wind alignment angle for the determined windspeed section is subtracted from the current detected wind alignment angle, to obtain the detected wind alignment angle that is corrected.

In another embodiment, the step of correcting the current detected wind alignment angle may include a followings step. The deviation in the wind alignment angle for the determined windspeed section, and a deviation in the wind alignment angle for at least one windspeed section adjacent to the determined windspeed section, are weighted to obtain a weighted deviation. The detected wind alignment angle that is corrected is obtained, by subtracting the weighted deviation from the current detected wind alignment angle. A weighting coefficient of the deviation in the wind alignment angle for each windspeed section in the weighting is determined based on a difference from the current ambient wind speed to a median of said windspeed section.

For example, the current ambient wind speed is 6.1 m/s, belonging to a windspeed section [5.75, 6.25], and the detected wind alignment angle that is corrected may be obtained subtracting the deviation in the wind alignment angle for the windspeed section [5.75, 6.25] from the current detected wind alignment angle. Alternatively, the deviation in the wind alignment angle for the windspeed section [5.75, 6.25] and a deviation in the wind alignment angle for a windspeed section [6.25, 6.75] adjacent to the windspeed section [5.75, 6.25] may be weighted to obtain a weighted deviation. The weighting coefficients may be determined based on a distance from the current ambient wind speed 6.1 m/s to a median value of the windspeed section [5.75, 6.25] and a distance from the current ambient wind speed 6.1 m/s to a median value of the windspeed section [6.25, 6.75]. The detected wind alignment angle that is corrected is obtained by subtracting the weighted deviation from the current detected wind alignment angle.

In addition, the detected wind alignment angle may be corrected in other suitable manners, based on the deviation in the wind alignment angle corresponding to the windspeed section to which the current ambient wind speed belongs.

Figure 5:
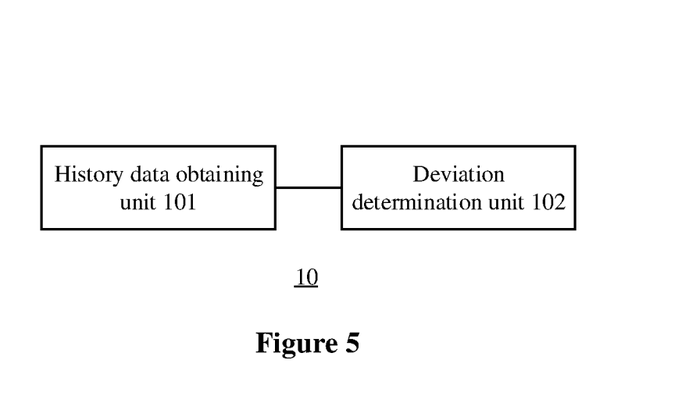
FIG. 5 is a block diagram of an apparatus for determining a deviation in a wind alignment angle of a wind turbine according to an embodiment of the present disclosure.

FIG. 5 is a block diagram of an apparatus for determining a deviation in a wind alignment angle of a wind turbine according to an embodiment of the present disclosure.

As shown in FIG. 5, the apparatus 10 for determining a deviation in a wind alignment angle of a wind turbine includes a history data obtaining unit 101 and a deviation determination unit 102, according to an embodiment of the present disclosure.

The history data obtaining unit 101 is configured to obtain history operation data of a wind turbine within a time period, where the history operation data includes ambient wind speeds, detected wind alignment angles, and output power that are at different moments in the time period.

In one embodiment, the time period may be a time period in which the wind turbine operates normally, which excludes a failure of the wind turbine, starting and halting of the wind turbine, and limited-power operation of the wind turbine.

The deviation determination unit 102 is configured to determine the deviation in the wind alignment angle for each windspeed section, based on the obtained history operation data. The deviation determination unit 102 determines the deviation in the wind alignment angle for a windspeed section based on the detected wind alignment angle and the output power at a moment within the time period, where the ambient wind speed at said moment belongs to the windspeed section.

In one embodiment, the deviation determination unit 102 may determine the deviation in the wind alignment angle for an i-th windspeed section, based on average power of each angle section corresponding to the i-th windspeed section. Average power $P_{ij}$ of a j-th angle section corresponding to the i-th windspeed section is an average of output power at all the moments at each of which the ambient wind speed belongs to the i-th windspeed section and the detected wind alignment belongs to the j-th angle section. A predetermined windspeed range is divided into M windspeed sections, with a first predetermined interval. A predetermined angle range is divided into N angle sections, with a second predetermined interval, where i and j are integers, M≥i>0, and N≥j>0.

In one embodiment, the deviation determination unit 102 may fit average power of the N angle sections corresponding to the i-th windspeed section and medians of the N angle sections based on equation (1), to obtain the deviation $\alpha_i$ in the wind alignment angle for the i-th windspeed section and power $P_{imax}$ of the wind turbine facing windward for the i-th windspeed section.

In one embodiment, the deviation determination unit 102 may obtain the deviation in the wind alignment angle for each pair of symmetrical angle sections corresponding to the i-th windspeed section, and determine the deviation in the wind alignment angle for the i-th windspeed section, based on the obtained deviation in the wind alignment angle for each pair of symmetrical angle sections.

In one embodiment, the deviation determination unit 102 may determine the deviation in the wind alignment angle for a pair of symmetrical angle sections corresponding to the i-th windspeed section, based on average power of both angle sections that are included in the pair of symmetrical angles corresponding to the i-th windspeed section. Each pair of symmetrical angle sections include two angle sections that are symmetrical with respect to a reference angle section, and the reference angle section is one of the N angle sections.

In one embodiment, the deviation determination unit 102 may obtain average power $P_{i(k_1)}$ and $P_{i(k_2)}$ of angle sections $k_1$ and $k_2$, respectively, corresponding to the i-th windspeed section, for a k-th pair of symmetrical angle sections serving as the pair of symmetrical angle sections. The deviation determination unit 102 may calculate the deviation $\alpha_{i(k)}$ in the wind alignment angle for the k-th pair of symmetrical angle sections corresponding to the i-th windspeed section, based on equation (2) or equation (3).

In one embodiment, the deviation determination unit 102 may calculate $\alpha_{i(k)}$ in a case that a difference between $d_k$ and an angle difference is less than a first preset threshold, where the angle difference is between the two angle sections $k_1$ and $k_2$ and calculated based on $P_{i(k_1)}$, $P_{i(k_2)}$, and $P_{i(ref)}$.

In one embodiment, the apparatus 10 for determining the deviation in the wind alignment angle of the wind turbine may further include an abnormal data deletion unit (not shown in figures). The abnormal data deletion unit is configured to determine abnormal data in the obtained history operation data for each windspeed section, and delete the determined abnormal data, such that the deviation determination unit 102 determines the deviation in the wind alignment angle for the windspeed section based on the history operation data from which abnormal data is deleted. The abnormal data deletion unit may determine the ambient wind speeds, the detected wind alignment angles, and the output power at all the moments, at each of which the ambient wind speed belongs to the i-th windspeed section and the detected wind alignment angles belongs to the j-th angle section, as the abnormal data for the i-th windspeed section, in a case that a quantity of all said moments is less than a second preset threshold, and/or in a case that a standard deviation of output power at all said moments is greater than a third preset threshold.

The apparatus 10 for determining the deviation in the wind alignment angle of the wind turbine may be implemented with reference to an embodiment of the present disclosure in conjunction with FIG. 2 and FIG. 3, which is not repeated herein.

Figure 6:
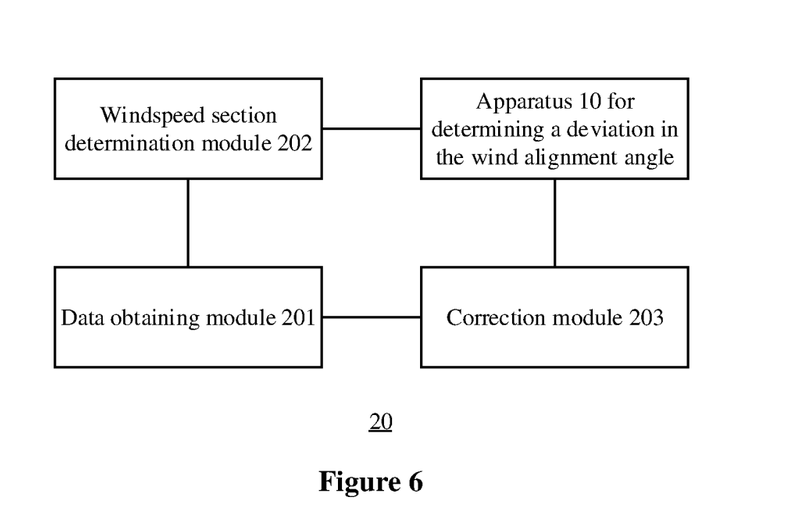
FIG. 6 is a block diagram of a system for correcting a wind alignment angle of a wind turbine according to an embodiment of the present disclosure.

FIG. 6 is a block diagram of a system for correcting a wind alignment angle of a wind turbine according to an embodiment of the present disclosure.

In one embodiment as shown in FIG. 6, the system 20 for correcting a wind alignment angle of a wind turbine includes: a data obtaining module 201, a windspeed section determination module 202, the apparatus 10 for determining a deviation in the wind alignment angle of the wind turbine, and a correction module 203.

The data obtaining module 201 is configured to obtain a current ambient wind speed and a current detected wind alignment angle of the wind turbine.

The windspeed section determination module 202 is configured to determine a windspeed section to which the current ambient wind speed belongs.

The apparatus 10 for determining the deviation in the wind alignment angle of the wind turbine is configured to determine the deviation in the wind alignment angle for each windspeed section.

The correction module 203 is configured to correct the current detected wind alignment angle, based on the deviation in the wind alignment angle for the determined windspeed section, where the deviation is outputted by the device 10 for determining the deviation in the wind alignment angle. Thereby, a yaw angle of the wind turbine determined based on the detected wind alignment angle that is corrected.

In one embodiment, the correction module 203 may subtract the deviation in the wind alignment angle for the determined windspeed section from the current detected wind alignment angle, to obtain the detected wind alignment angle that is corrected.

In another embodiment, the correction module 203 may weight deviation in the wind alignment angle for the determined windspeed section, and a deviation in the wind alignment angle for at least one windspeed section adjacent to the determined windspeed section, to obtain a weighted deviation. The correction module 203 may subtract the weighted deviation from the current detected wind alignment angle, to obtain the detected wind alignment angle that is corrected. A weighting coefficient of the deviation in the wind alignment angle for each windspeed section in weighting is determined based on a difference from the current ambient wind speed to a median of said windspeed section.

The system for correcting the wind alignment angle of the wind turbine may be implemented with reference to an embodiment of the present disclosure in conjunction with FIG. 2 to FIG. 4, which is not repeated herein.

A computer-readable storage medium storing a computer program is further provided according to an embodiment of the present disclosure. The method for determining the deviation in the wind alignment angle of the wind turbine according to the aforementioned embodiment is performed when the computer program is executed by a processor.

A computing device is further provided according to an embodiment of the present disclosure, including a processor (not shown in figures) and a memory (not shown in figures). The memory stores a computer program. The method for determining the deviation in the wind alignment angle of the wind turbine according to the aforementioned embodiment is performed when the computer program is executed by the processor.

A computer-readable storage medium storing a computer program is further provided according to an embodiment of the present disclosure. The method for correcting the wind alignment angle of the wind turbine according to the aforementioned embodiment is performed when the computer program is executed by a processor.

A control system of a wind turbine is further provided according to an embodiment of the present disclosure includes: a processor (not shown) and a memory (not shown). The memory stores a computer program. The method for correcting the wind alignment angle of the wind turbine according to the aforementioned embodiment is performed when the computer program is executed by the processor.

In addition, the units and the modules in the apparatus for determining a deviation in the wind alignment angle of the wind turbine and the system for correcting the wind alignment angle of the wind turbine may be implemented as hardware and/or software components according to embodiments of the present disclosure. The units and the modules may be implemented by those skilled in the art through, for example, field programmable gate arrays (FPGA) or application specific integrated circuits (ASIC), according to defined processing performed by each unit.

In addition, the method for determining the deviation in the wind alignment angle of the wind turbine and the method for correcting the wind alignment angle of the wind turbine may be implemented as computer codes in a computer-readable recording medium according to embodiments of the present disclosure. The computer code may be implemented by those skilled in the art according to description of the aforementioned methods. The aforementioned method is performed when the computer code is executed in a computer.

Although some embodiments of the present disclosure are described hereinabove, those skilled in the art should appreciate that the embodiments may be modified without deviating from the principles and the spirit of the present disclosure, which are limited by the claims and the equivalent thereof.

The invention claimed is:

1. A method for determining a deviation in a wind alignment angle of a wind turbine, comprising:
    obtaining historical operation data of the wind turbine within a time period, wherein the historical operation data comprise ambient wind speeds, detected wind alignment angles, and output power that are at different moments in the time period;
    dividing a predetermined windspeed range into M windspeed sections with a first predetermined interval, wherein M is a positive integer;
    dividing a predetermined angle range into N angle sections with a second predetermined interval, wherein N is a positive integer; and
    for an i-th windspeed section with i being a positive integer and $0<i\leq M$, determining a deviation in the wind alignment angle for the i-th windspeed section based on one or more corresponding detected wind alignment angles and corresponding output power at one or more moments within the time period, wherein one or more corresponding ambient wind speeds at the one or more moments belong to the i-th windspeed section, and
    wherein the deviation in the wind alignment angle for the i-th windspeed section is determined further based on average power of each angle section corresponding to the i-th windspeed section by:
        obtaining a deviation in the wind alignment angle for each pair of symmetrical angle sections corresponding to the i-th windspeed section, wherein each pair of symmetrical angle sections comprises two angle sections that are symmetrical with respect to a reference angle section, and the reference angle section is one of the N angle sections; and
        determining the deviation in the wind alignment angle for the i-th windspeed section based on the obtained deviation in the wind alignment angle for each pair of symmetrical angle sections.

2. The method according to claim 1,
    wherein average power $P_{ij}$ of a j-th angle section corresponding to the i-th windspeed section is an average of output power at at least a subset of the moments at each of which the ambient wind speed belongs to the i-th windspeed section and the detected wind alignment belongs to the j-th angle section, wherein j is an integer and $0<j\leq N$.

3. The method according to claim 2, further comprising: determining abnormal data in the obtained historical operation data for each windspeed section; and deleting the determined abnormal data, wherein determining the deviation in the wind alignment angle for the windspeed section is based on the historical operation data from which the abnormal data is deleted; wherein determining the abnormal data in the obtained historical operation data for each windspeed section comprises: determining the ambient wind speeds, the detected wind alignment angles, and the output power at the subset of the moments, at each of which the ambient wind speed belongs to the i-th windspeed section and the detected wind alignment angles belongs to the j-th angle section, as the abnormal data for the i-th windspeed section, when at least one of the following is satisfied: a quantity of the subset of the moments is less than a second preset threshold; or, a standard deviation of output power at the subset of the moments is greater than a third preset threshold.

4. The method according to claim 1, wherein obtaining the deviation in the wind alignment angle for each pair of symmetrical angle sections corresponding to the i-th windspeed section comprises:
for each pair of symmetrical angle sections corresponding to the i-th windspeed section, determining the deviation in the wind alignment angle for the pair of symmetrical angle sections based on average power of both angle sections that are comprised in the pair of symmetrical angles.

5. The method according to claim 1, wherein obtaining the deviation in the wind alignment angle for each pair of symmetrical angle sections corresponding to the i-th windspeed section comprises:
for a k-th pair of symmetrical angle sections corresponding to the i-th windspeed section and comprising angle sections $k_1$ and $k_2$, obtaining average power $P_{i(k_1)}$ and $P_{i(k_2)}$ of the angle sections $k_1$ and $k_2$, respectively; and calculating the deviation $\alpha_{i(k)}$ in the wind alignment angle for the k-th pair of symmetrical angle sections based on:

$$\alpha_{i(k)} = \cos^{-1} \frac{P_{i(ref)}^{\frac{1}{3}}}{\left( \frac{P_{i(ref)}^{\frac{2}{3}} - P_{i(k_1)}^{\frac{1}{3}} P_{i(k_2)}^{\frac{1}{3}}}{1 - \left( \frac{P_{i(k_1)}^{\frac{1}{3}} + P_{i(k_2)}^{\frac{1}{3}}}{2 P_{i(ref)}^{\frac{1}{3}}} \right)^2} \right)^{\frac{1}{2}}}, \text{ or}$$

$$\alpha_{i(k)} = \tan^{-1} \frac{\left( P_{i(k_1)}^{\frac{1}{3}} + P_{i(k_2)}^{\frac{1}{3}} \right) \cos \frac{d_k}{2}}{\left( P_{i(k_2)}^{\frac{1}{3}} - P_{i(k_1)}^{\frac{1}{3}} \right) \sin \frac{d_k}{2}},$$

wherein k is an integer greater than 0, $k_1$ and $k_2$ indicate the angle sections comprised in the k-th pair of symmetrical angle sections, $P_{i(ref)}$ indicates average power of the reference angle section corresponding to the i-th windspeed section, and $d_k$ is equal to a difference in a sequential number between the angle sections $k_1$ and $k_2$ multiplying the second predetermined interval.

6. The method according to claim 5, wherein:
$\alpha_{i(k)}$ is calculated when a difference between $d_k$ and an angle difference is less than a first preset threshold;
wherein the angle difference is between the two angle sections $k_1$ and $k_2$ and calculated based on $P_{i(k_1)}$, and $P_{i(k_2)}$, and $P_{i(ref)}$; and
wherein $$\gamma_{i(k)} = \cos^{-1} \frac{P_{i(k_1)}^{\frac{1}{3}} + P_{i(k_2)}^{\frac{1}{3}}}{2 P_{i(ref)}^{\frac{1}{3}}}.$$

7. The method according to claim 1, wherein the time period is a time period in which the wind turbine operates normally, excluding a failure of the wind turbine, starting and halting of the wind turbine, and limited-power operation of the wind turbine.

8. A method for correcting a wind alignment angle of a wind turbine, comprising:
obtaining a current ambient wind speed and a current detected wind alignment angle of the wind turbine;
determining a windspeed section to which the current ambient wind speed belongs;
obtaining historical operation data of the wind turbine within a time period, wherein the historical operation data comprise ambient wind speeds, detected wind alignment angles, and output power that are at different moments in the time period;
dividing a predetermined angle range into N angle sections with a predetermined interval, wherein N is a positive integer;
determining a deviation in the current detected wind alignment angle for the windspeed section based on the current detected wind alignment angle and corresponding output power at one or more moments within the time period, wherein one or more corresponding ambient wind speeds at the one or more moments belong to the windspeed section, and
wherein the deviation in the current detected wind alignment angle for the windspeed section is determined further based on average power of each angle section corresponding to the windspeed section by:
obtaining a deviation in the current detected wind alignment angle for each pair of symmetrical angle sections corresponding to the windspeed section, wherein each pair of symmetrical angle sections comprises two angle sections that are symmetrical with respect to a reference angle section, and the reference angle section is one of the N angle sections; and
determining the deviation in the current detected wind alignment angle for the windspeed section based on the obtained deviation in the current detected wind alignment angle for each pair of symmetrical angle sections;
correcting the current detected wind alignment angle based on the deviation in the current detected wind alignment angle for the determined windspeed section to obtain a corrected wind alignment angle; and
determining a yaw angle of the wind turbine based on the corrected wind alignment angle.

9. The method according to claim 8, wherein:
correcting the current detected wind alignment angle comprises:
subtracting the deviation in the current detected wind alignment angle for the determined windspeed section from the current detected wind alignment angle to obtain the corrected wind alignment angle; or
correcting the current detected wind alignment angle comprises:
weighting the deviation in the current detected wind alignment angle for the determined windspeed section and a deviation in the current detected wind alignment angle for at least one windspeed section adjacent to the determined windspeed section to obtain a weighted deviation; and subtracting the weighted deviation from the current detected wind alignment angle to obtain the corrected wind alignment angle;

wherein a weighting coefficient of a corresponding deviation in the current detected wind alignment angle for each windspeed section in the weighting is determined based on a difference from the current ambient wind speed to a median of the windspeed section.

10. An apparatus for determining a deviation in a wind alignment angle of a wind turbine, comprising:

a memory configured to store historical operation data of a wind turbine within a time period, wherein the historical operation data comprise ambient wind speeds, detected wind alignment angles, and output power that are at different moments in the time period; and at least one processor configured to:
obtain the historical operation data of the wind turbine within the time period from the memory;
divide a predetermined windspeed range into M windspeed sections with a first predetermined interval, wherein M is a positive integer;
divide a predetermined angle range into N angle sections with a second predetermined interval, wherein N is a positive integer; and
for an i-th windspeed section with i being a positive integer and 0<i≤M, determine a deviation in the wind alignment angle for the i-th windspeed section based on one or more corresponding detected wind alignment angles and corresponding output power at one or more moments within in the time period, wherein one or more ambient wind speeds at the one or more moments belong to the windspeed section, and
wherein the deviation in the wind alignment angle for the i-th windspeed section is further determined based on average power of each angle section corresponding to the i-th windspeed section by:
obtaining a deviation in the wind alignment angle for each pair of symmetrical angle sections corresponding to the i-th windspeed section, wherein each pair of symmetrical angle sections comprises two angle sections that are symmetrical with respect to a reference angle section, and the reference angle section is one of the N angle sections; and
determining the deviation in the wind alignment angle for the i-th windspeed section based on the obtained deviation in the wind alignment angle for each pair of symmetrical angle sections.

11. The apparatus according to claim 10, wherein average power $P_{ij}$ of a j-th angle section corresponding to the i-th windspeed section is an average of output power at at least a subset of the moments at each of which the ambient wind speed belongs to the i-th windspeed section and the detected wind alignment belongs to the j-th angle section, wherein j is an integer and 0<j≤N.

12. The apparatus according to claim 11, wherein the at least one processor is further configured to: determine abnormal data in the obtained historical operation data for each windspeed section, and delete the determined abnormal data, wherein the deviation in the wind alignment angle for the windspeed section is determined based on the historical operation data from which the abnormal data is deleted; determine the ambient wind speeds, the detected wind alignment angles, and the output power at the subset of the moments, at each of which the ambient wind speed belongs to the i-th windspeed section and the detected wind alignment angles belongs to the j-th angle section, as the abnormal data for the i-th windspeed section, when at least one of the following is satisfied: a quantity of the subset of the moments is less than a second preset threshold, or, a standard deviation of output power at the subset of the moments is greater than a third preset threshold.

13. A method for determining a deviation in a wind alignment angle of a wind turbine, comprising:

obtaining historical operation data of the wind turbine within a time period, wherein the historical operation data comprise ambient wind speeds, detected wind alignment angles, and output power that are at different moments in the time period;

dividing a predetermined windspeed range into M windspeed sections with a first predetermined interval, wherein M is a positive integer;

dividing a predetermined angle range into N angle sections with a second predetermined interval, wherein N is a positive integer; and for an i-th windspeed section with i being a positive integer and 0<i≤M, determining a deviation in the wind alignment angle for the i-th windspeed section based on one or more corresponding detected wind alignment angles and corresponding output power at one or more moments within the time period, wherein one or more corresponding ambient wind speeds at the one or more moments belong to the i-th windspeed section, and wherein the deviation in the wind alignment angle for the i-th windspeed section is determined further based on average power of each angle section corresponding to the i-th windspeed section by:

fitting average power of the N angle sections corresponding to the i-th windspeed section and medians of the N angle sections to obtain $\alpha_i$ and $P_{imax}$ based on:

$$P_{ij} = P_{imax} \cos^3(\theta_{ij} - \alpha_i),$$

wherein $\alpha_i$ denotes the deviation in the wind alignment angle for the i-th windspeed section, $P_{ij}$ denotes average power of a j-th angle section corresponding to the i-th windspeed section, with j being an integer and 0<j≤N, $\theta_{ij}$ indicates a median of the j-th angle section corresponding to the i-th windspeed section, and $P_{imax}$ denotes power of the wind turbine facing windward for the i-th windspeed section.

14. An apparatus for determining a deviation in a wind alignment angle of a wind turbine, comprising:

a memory configured to store historical operation data of a wind turbine within a time period, wherein the historical operation data comprise ambient wind speeds, detected wind alignment angles, and output power that are at different moments in the time period; and at least one processor configured to:
obtain the historical operation data of the wind turbine within the time period from the memory;
divide a predetermined windspeed range into M windspeed sections with a first predetermined interval, wherein M is a positive integer;

divide a predetermined angle range into N angle sections with a second predetermined interval, wherein N is a positive integer; and for an i-th windspeed section with i being a positive integer and $0<i\leq M$, determine a deviation in the wind alignment angle for the i-th windspeed section based on one or more corresponding detected wind alignment angles and corresponding output power at one or more moments within in the time period, wherein one or more ambient wind speeds at the one or more moments belong to the windspeed section, and wherein the deviation in the wind alignment angle for the i-th windspeed section is further determined based on average power of each angle section corresponding to the i-th windspeed section by:

fitting average power of the N angle sections corresponding to the i-th windspeed section and medians of the N angle sections to obtain $\alpha_i$ and $P_{imax}$ based on:

$$P_{ij} = P_{imax} \cos^3(\theta_{ij} - \alpha_i),$$

wherein $\alpha_i$ denotes the deviation in the wind alignment angle for the i-th windspeed section, $P_{ij}$ denotes average power of a j-th angle section corresponding to the i-th windspeed section, with j being an integer and $0<j\leq N$, $\theta_{ij}$ indicates a median of the j-th angle section corresponding to the i-th windspeed section, and $P_{imax}$ denotes power of the wind turbine facing windward for the i-th windspeed section.

* * * * *